United States Patent
Chang et al.

(10) Patent No.: US 8,736,919 B2
(45) Date of Patent: May 27, 2014

(54) IMAGE SYSTEMS AND SCAN METHODS

(75) Inventors: Li-Yuan Chang, Taipei (TW);
Chin-Chung Nien, Hsinchu (TW);
Lien-Yi Cho, Miaoli County (TW);
Chun-Yen Huang, Yunlin County (TW);
Ya-Chung Yu, Chiayi (TW);
Chen-Ming Li, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 64 days.

(21) Appl. No.: 13/491,387

(22) Filed: Jun. 7, 2012

(65) Prior Publication Data

US 2013/0120805 A1   May 16, 2013

(30) Foreign Application Priority Data

Nov. 16, 2011 (TW) .............................. 100141749 A (51) Int. Cl.
*H04N 1/04* (2006.01)

(52) U.S. Cl.
USPC ........... 358/474; 358/475; 358/483; 342/174; 374/122

(58) Field of Classification Search
USPC .................. 358/474, 475, 482, 483, 509, 462; 342/351, 174; 374/2, 122
See application file for complete search history.

(56) References Cited

U.S. PATENT DOCUMENTS

| | | | | | |
|---|---|---|---|---|---|
| 3,474,160 | A | * | 10/1969 | Doering | 264/40.1 |
| 3,508,035 | A | * | 4/1970 | Worthley | 702/175 |
| 4,482,252 | A | * | 11/1984 | Lorenz | 356/448 |
| 5,255,007 | A | * | 10/1993 | Bakx | 347/247 |
| 5,465,284 | A | * | 11/1995 | Karellas | 378/62 |
| 5,568,261 | A | * | 10/1996 | Wakai et al. | 356/601 |
| 5,898,480 | A | * | 4/1999 | Ozawa | 355/67 |
| 6,154,269 | A | * | 11/2000 | Ozawa | 355/53 |
| 6,375,624 | B1 | * | 4/2002 | Uber et al. | 600/549 |
| 6,430,378 | B1 | * | 8/2002 | Ozawa | 399/32 |
| 6,608,705 | B1 | * | 8/2003 | Oshima et al. | 358/475 |

(Continued)

OTHER PUBLICATIONS

Denis Notel et al. "A Compact mmW Imaging Radiometer for Concealed Weapon Detection," 15th International Conference on Terahertz Electronics, Sep. 2007, pp. 269-270, IEEE, US.

(Continued)

*Primary Examiner* — Negussie Worku (57) ABSTRACT

An imaging system is provided, including a detection unit and a scan unit. The detection unit senses radiation of a target area. The scan unit directs the radiation to the detection unit, in which the scanning unit scans the target area N times at a constant speed within a scan period, such that each of the pixels of the target area is scanned N times by the scan unit, thereby the detection unit generates N sub-detection values for each of the pixels and adds the N sub-detection values up to generate a detection value for each of the pixels.

8 Claims, 6 Drawing Sheets

(56) References Cited

U.S. PATENT DOCUMENTS

| | | |
|---|---|---|
| 6,729,756 B2 | 5/2004 | Sczai |
| 6,760,096 B2 * | 7/2004 | Kitabayashi et al. ......... 356/124 |
| 6,900,756 B2 | 5/2005 | Salmon |
| 7,092,105 B2 * | 8/2006 | Lim et al. ....................... 356/601 |
| 7,321,685 B2 * | 1/2008 | Okada et al. .................. 382/167 |
| 7,763,828 B2 * | 7/2010 | Talwar et al. ............ 219/121.76 |
| 8,009,116 B2 * | 8/2011 | Peichl et al. .................. 343/757 |
| 8,212,227 B2 * | 7/2012 | Watanabe et al. ........... 250/492.3 |
| 8,305,561 B2 * | 11/2012 | Mori et al. .................... 356/5.01 |
| 8,477,234 B2 * | 7/2013 | Tanigawa et al. ............. 348/370 |
| 8,488,219 B2 * | 7/2013 | Mikami ........................ 358/475 |
| 8,497,919 B2 * | 7/2013 | Hirose ........................ 348/221.1 |
| 8,537,416 B2 * | 9/2013 | Sandstrom et al. ............ 358/1.8 |
| 2007/0257188 A1 | 11/2007 | Robertson et al. |

OTHER PUBLICATIONS

K. Al-Ansari et al., "Calibration Procedure of a Microwave Total-Power Radiometer," Microwave and Wireless Components Letters, Mar. 2002, pp. 93-95, vol. 12, No. 3, IEEE, US.

Jonathan Drewes et al., "Design of a High Resolution Passive Millimeter Wavelength Camera for Security Applications," Proc. of SPIE, Apr. 2009, pp. 73090B-1-73090B-12, vol. 7309, SPIE, US.

Minkyoo Jung et al., "Development of Passive Millimeter Wave Imaging System at W-band," 34th International Conference on Infrared, Millimeter, and Terahertz Waves, Sep. 2009, pp. 1-2, IEEE, US.

* cited by examiner

IMAGE SYSTEMS AND SCAN METHODS

CROSS REFERENCE TO RELATED APPLICATIONS

This Application claims priority of Taiwan Patent Application No. 100141749, filed on Nov. 16, 2011, the entirety of which is incorporated by reference herein.

BACKGROUND

1. Technical Field

The present technical field relates to image systems, and in particular relates to a microwave image system.

2. Description of the Related Art

Currently, radiometers for detecting microwaves are widely applied in imaging systems, such as the customs formalities or important meetings. However, gains of radiometers may drift when an integration period of scan is extended. Therefore, image systems use a calibration unit to calibrate the gains of the radiometers, which increases design complexity of image systems. In addition, radiometers use step motors to scan images, such that the radiometer stays at the corresponding pixel for an constant integration period τ to accumulate enough energy. However, the stop and the motion of stepping motors are not accurate. Therefore, there is a need for an image system to overcome the problems described above.

SUMMARY

In light of the previously described problems, the disclosure provides an embodiment of an imaging system, including a detection unit and a scan unit. The detection unit senses radiation of a target area. The scan unit directs the radiation to the detection unit, in which the scanning unit scans the target area N times at a constant speed within a scan period, such that each of the pixels of the target area is scanned N times by the scan unit, thereby the detection unit generates N sub-detection values for each of the pixels and adds the N sub-detection values up to generate a detection value of each of the pixels.

The disclosure also provides a scan method suitable for an image system having a detection unit and a scan unit. The scan method includes the steps of: scanning a target area N times by the scan unit at a constant speed within a scan period, such that each of the pixels in the target area is scanned N times by the scan unit, thereby N sub-detection values are generated for each of the pixels; and adding up the N sub-detection values to generate a detection value for each of the pixels.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The slope of the disclosure is best determined by reference to the appended claims.

Figure 1:
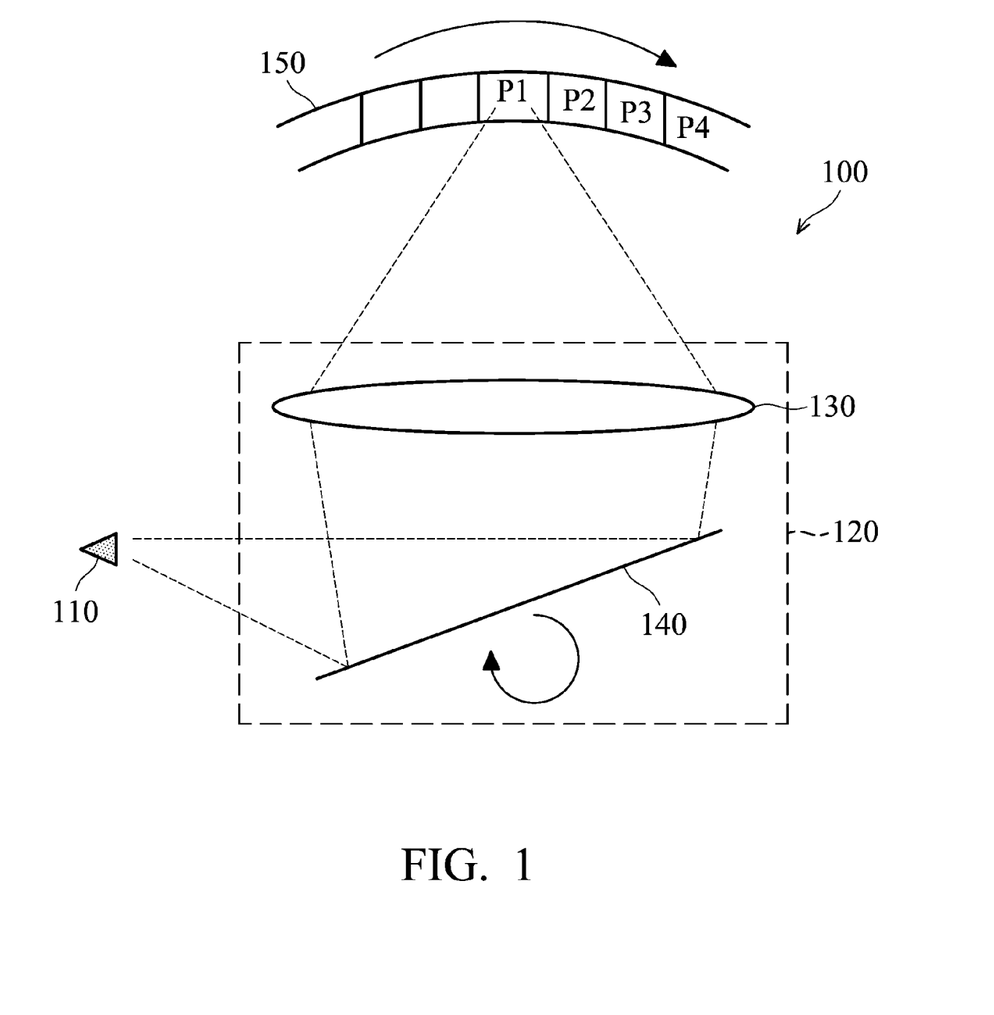
FIG. 1 illustrates a schematic view of an image system of the disclosure.

FIG. 1 illustrates a schematic view of an image system of the disclosure. As shown in FIG. 1, the image system 100 includes a detection unit 110 and a scan unit 120. In detail, the detection unit 110 senses radiation. In the embodiments, the detection unit 110 can be a microwave radiometer. The scan unit 120 directs the radiation of a target area 150 to the detection unit 110.

Furthermore, the scan unit 120 includes a focus unit 130 and a rotatable reflection plate 140. The focus unit 130 can be a reflective focus unit or a refractive focus unit in order to focus radiation to the detection unit 110. The rotatable reflective plate 140 is disposed between the detection unit 110 and the focus unit 130 to reflect radiation from the focus unit 130 to the detection unit 110. In some embodiments, the rotatable reflective plate 140 is disposed between the target area 150 and the focus unit 130 to reflect the radiation of the target area 150 to the focus unit 130 and the detection unit 110. The rotatable reflection plate 140 continuously rotates (or rotates at a constant speed) rather than rotates step by step. For example, the scan unit 120 scans the pixels P1 and P2, or scans the pixel P2 from the pixel P1 by a continuous rotation (or a constant speed rotation) of the rotatable reflection plate 140.

The scan unit 120 scans the target area (150) N times at the constant speed within a scan period, such that each of the pixels (e.g., pixel P1 or pixel P2 etc.) in the target area (150) is scanned N times by the detection unit 110, thereby the detection unit 110 generates N sub-detection values for each of the pixels and adds up the N sub-detection values to generate a detection value for each of the pixels, in which the detection value is corresponding to a value of the microwave radiation irradiated from the a single pixel in the target area within the integration period.

In detail, the scan unit 120 scans a pixel P1 in the target 150 N times, such that the detection unit 110 generates N sub-detection values and adds up the N sub-detection values to generate a detection value for pixel P1, in which the pixel P1 is scanned two times within a predetermined time interval. The scan of the pixel P1 is followed by the scan of the pixel P2 adjacent to the pixel P1. Similarly, the scan unit 120 scans the pixel P2 in the target area N times to generate N sub-detection values and adds up the N sub-detection values to generate a detection value for pixel P2.

All pixels in the target area 150 are scanned one time after the rotatable reflection plate 140 rotates one revolution (or a predetermined angle) at a constant speed. Therefore, the detection unit 110 can generate the detection values of the total pixels (e.g., pixels P1, P2, P3 and P4 etc.) in the target area 150 after the rotatable reflection plate 140 spins N revolutions, such that the image system 100 finishes the scanning of the target area 150.

Figure 2:
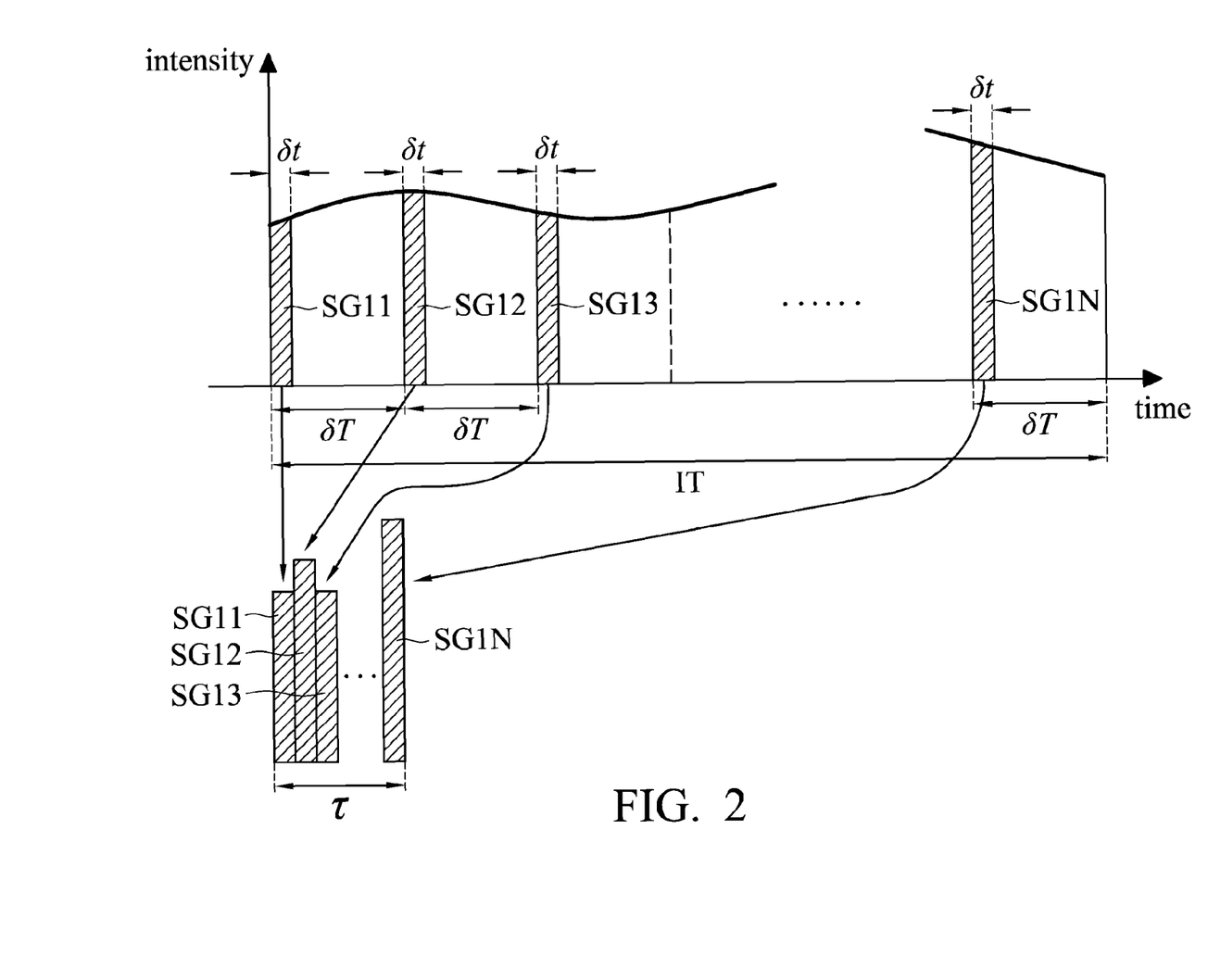
FIG. 2 illustrates a schematic view of the detection values and the sub-detection values of the disclosure for the illustration of the detection value corresponding to the pixel P1.

FIG. 2 illustrates a schematic view of the detection values and the sub-detection values of the disclosure for the illustration of the detection value corresponding to the pixel P1. As shown in FIG. 2, the rotatable reflection plate 140 of the scan unit 120 rotates N revolutions within a scan period IT. Therefore, the image system 100 scans all pixels in the target area 150 N times, in which an interval spent on scanning the pixel P1 two times is a predetermined time interval δT, and the scanning of the pixel P1 is followed by the scanning of the pixel P2 adjacent to the pixel P1. Therefore, the image system 100 generates sub-detection values SG11-SG1N within the scan period IT, and adds the N sub-detection values SG11-SG1N up to generate a detection value corresponding to the pixel P1. A period spent on scanning one pixel is an period δt, and a period spent on scanning one pixel N times is an integration period τ (i.e., τ=δt×N). In addition, the predetermined time interval δT can be an interval that the rotatable reflection plate 140 spends on rotating one revolution (or a predetermined angle).

Figure 3:
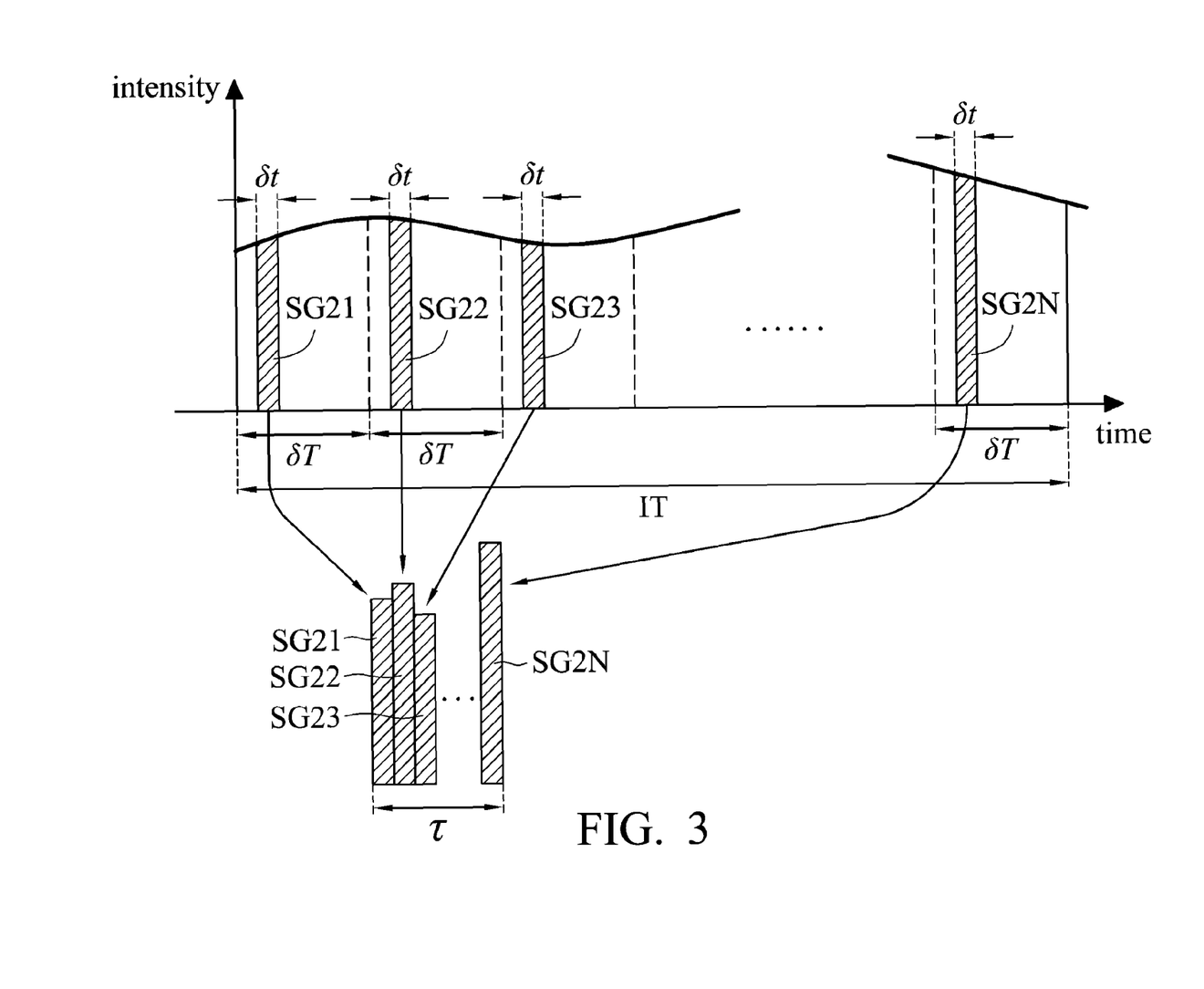
FIG. 3 illustrates a schematic view of the detection values and the sub-detection values of the disclosure for the illustration of the detection value corresponding to the pixel P2.

FIG. 3 illustrates a schematic view of the detection values and the sub-detection values of the disclosure for the illustration of the detection value corresponding to the pixel P2. As shown in FIG. 3, the rotatable reflection plate 140 of the scan unit 120 rotates N revolutions within a scan period IT. Therefore, the image system 100 scans the pixel P2 in the target area 150 N times, in which a interval spent on scanning the pixel P2 two times is the predetermined time interval δT. Therefore, the image system 100 generates sub-detection values SG21-SG2N within the scan period IT, and adds the N sub-detection values SG21-SG2N up to generate a detection value corresponding to the pixel P2.

Figure 4:
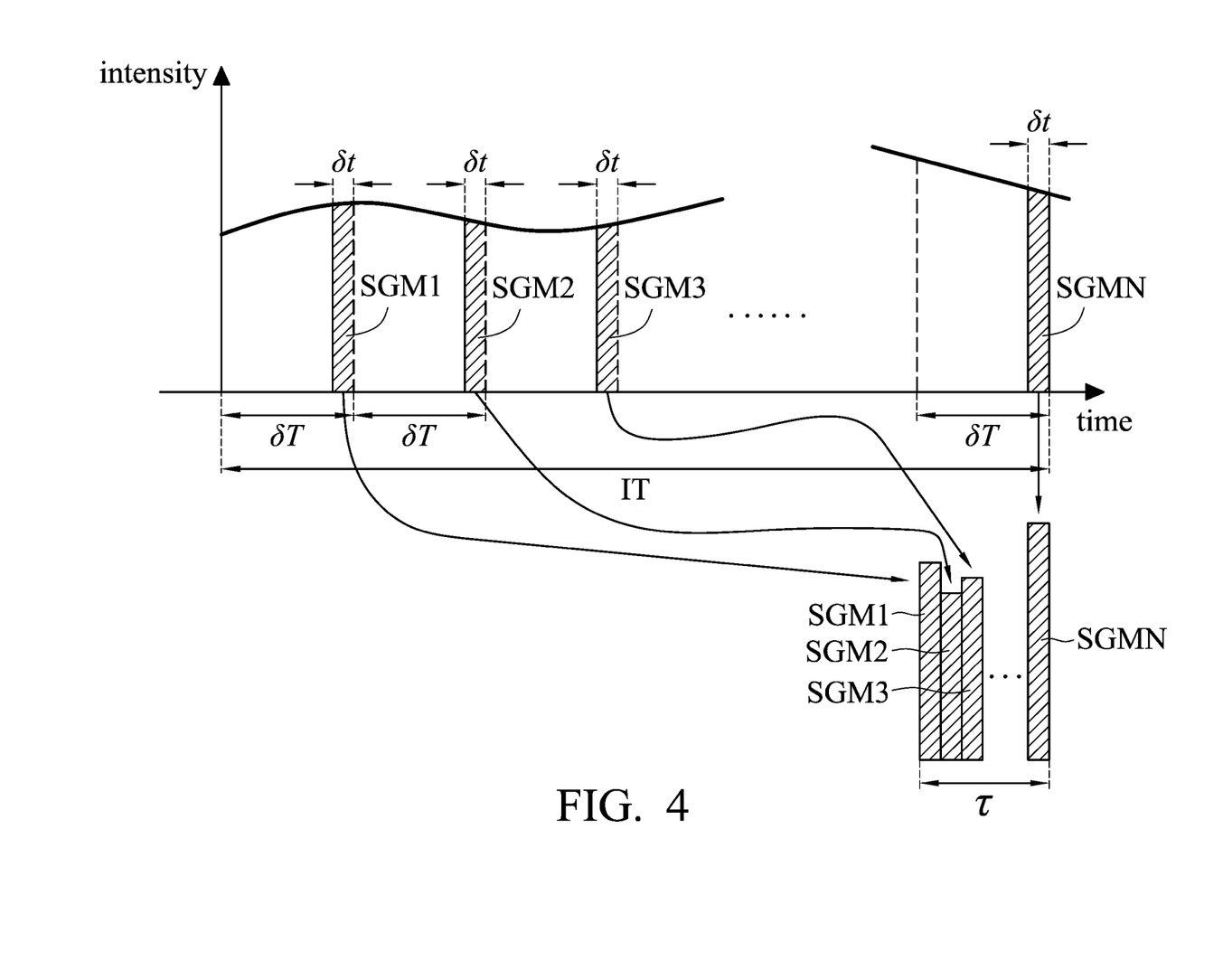
FIG. 4 illustrates a schematic view of the detection values and the sub-detection values of the disclosure for the illustration of the detection value corresponding to the pixel PM.

FIG. 4 illustrates a schematic view of the detection values and the sub-detection values of the disclosure for the illustration of the detection value corresponding to the pixel PM. As shown in FIG. 4, the rotatable reflection plate 140 of the scan unit 120 rotates N revolutions within the scan period IT. Therefore, the image system 100 scans the pixel PM in the target area 150 N times, in which a interval spent on scanning the pixel PM two times is the predetermined time interval δT. Therefore, the image system 100 generates sub-detection values SGM1-SGMN within the scan period IT, and adds the N sub-detection values SGM1-SGMN up to generate a detection value corresponding to the pixel PM.

A standard image system has a stepping motor to stop for the integration period τ when the pixel P1 is scanned, such that the stepping motor scans at a non-constant speed for to accumulate enough microwave radiations. Similarly, the standard image system stops for the integration period τ to accumulate enough microwave radiations when the pixel PM is scanned. However, because the gain of the scan unit may drift, the microwave radiation values of the pixels P1 and PM sensed by the detection unit are different even if the microwave radiations outputted by the pixels P1 and PM are the same.

Because the image system 100 of the disclosure generates sub-detection values at different time points and the drift of the gain of the detection unit 100 is slight within the period δt, the procedure that the N sub-detection values obtained at evenly distributed time points is added up to generate a detection value can decrease the gain difference generated by the pixel scans of the image system 100. Therefore, the image system 100 of the disclosure does not require a stepping motor or a calibration unit to overcome the gain drift of the detection unit 110.

Figure 5:
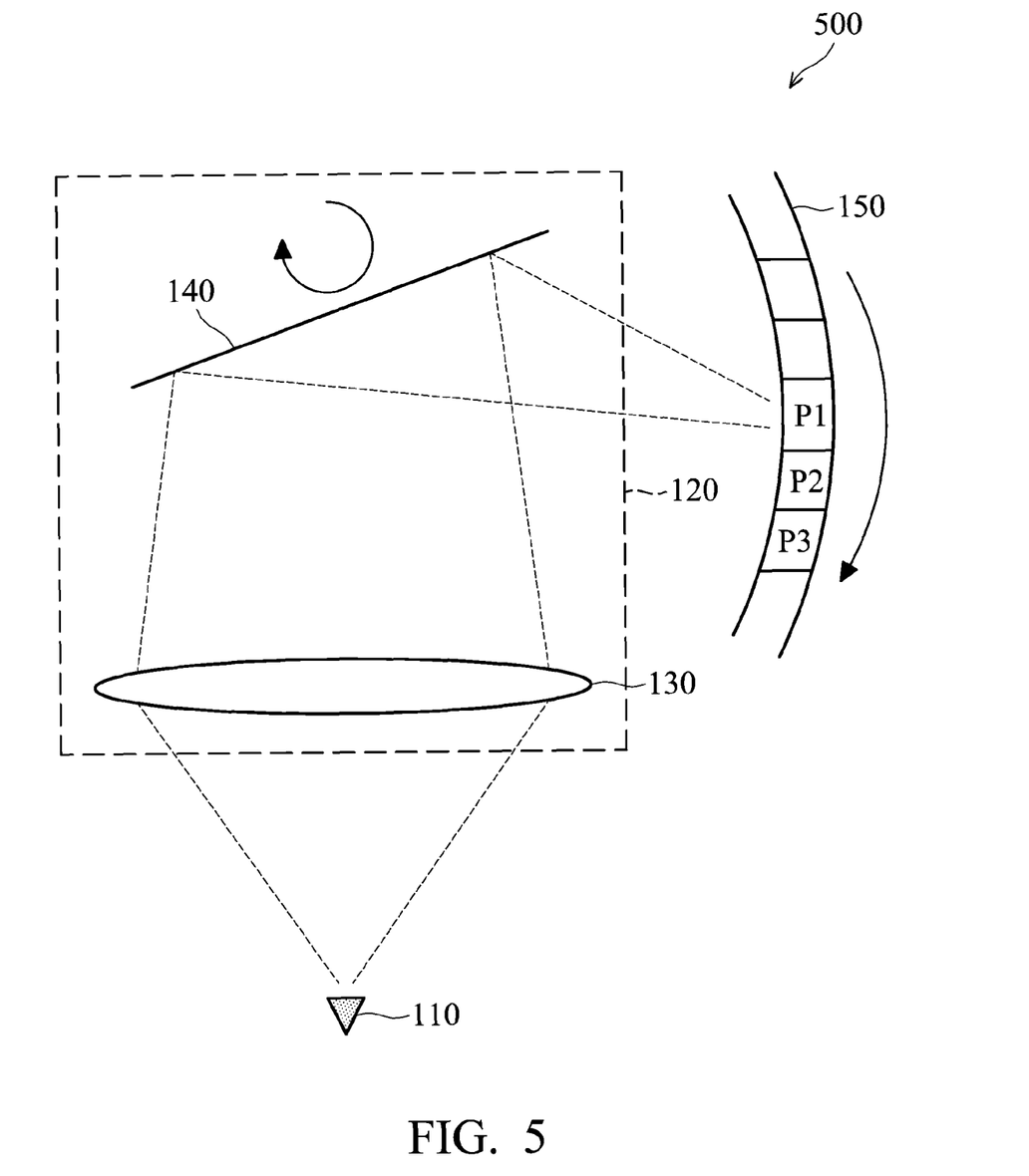
FIG. 5 illustrates another schematic view of the image system of the disclosure.

FIG. 5 illustrates another schematic view of the image system of the disclosure. As shown in FIG. 5, the image system 500 of FIG. 5 is similar to the image system 100 of FIG. 1. The difference is that the rotatable reflection plate 140 is disposed between the target area 150 and the focus unit 130.

Figure 6:
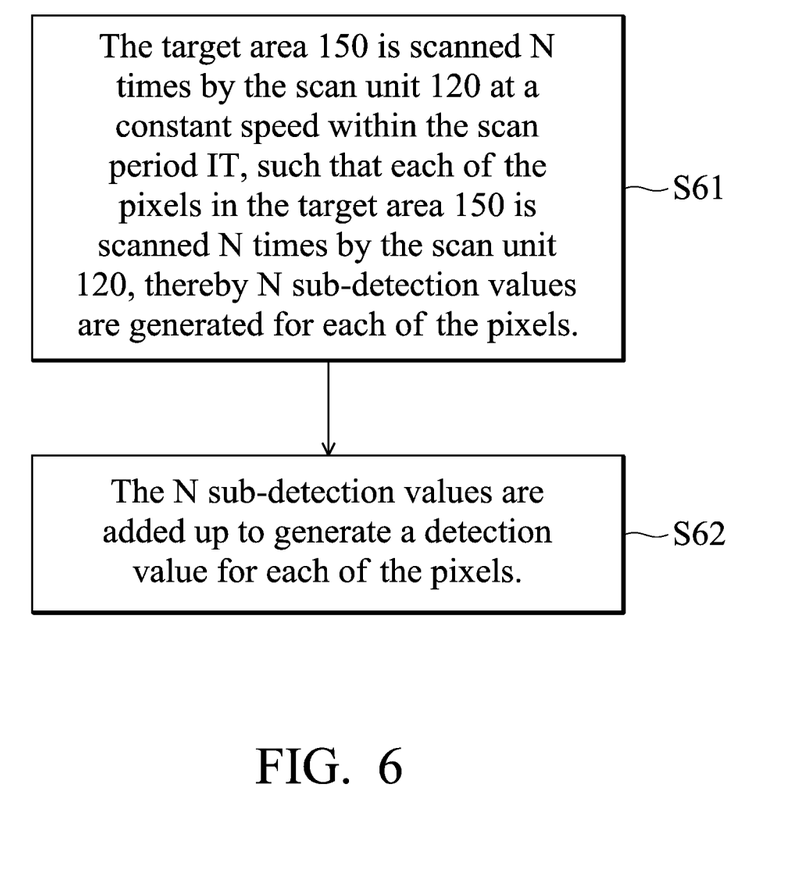
FIG. 6 illustrates a flowchart of a scan method of the disclosure.

FIG. 6 illustrates a flowchart of a scan method of the disclosure. As shown in FIG. 6, the scan method includes the following steps.

In step S61, the target area 150 is scanned N times by the scan unit 120 at a constant speed within the scan period IT, such that each of the pixels (e.g., the pixels P1-PM) in the target area 150 is scanned N times by the scan unit 120, thereby N sub-detection values (e.g., SG11-SG1N or SG(M−1)-SG(M−1)N) are generated for each of the pixels (e.g., the pixel P1 or P(M−1)).

In step S62, the N sub-detection values (e.g., SG11-SG1N or SG(M−1)-SG(M−1)N) are added up to generate a detection value for each of the pixels (e.g., the pixel P1 or P(M−1)). Therefore, the detection value (i.e., the radiation value) generated by the scan method has solved the problem with the gain drift of the detection unit, such that there is no need to perform additional calibration procedures.

The foregoing has outlined features of several embodiments so that those skilled in the art may better understand the disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and slope of the present disclosure, and that they may make various changes, substitutions and alterations herein without departing from the spirit and scope of the present disclosure.

What is claimed is:

1. An imaging system, comprising:
   a detection unit, sensing radiation of a target area comprising a plurality of pixels; and
   a scan unit, directing the radiation from the target area to the detection unit, comprising:
   a refractive focus unit refracting and focusing the radiation; and
   a rotatable reflection plate reflecting the radiation, wherein the refractive focus unit and rotatable reflection plate are arranged such that the radiation originating from the target area is directed to the detection unit;
   wherein the refractive focus unit and the rotatable reflection unit are configured to sequentially direct the radiation of each of the pixels of the target area to the detection unit N times at a constant speed within a scan period, such that each of the pixels of the target area is scanned N times by the scan unit, wherein the detection unit is configured to generate N sub-detection values for each of the pixels according to the radiation respectively sensed in each of the N scans and add up the N sub-detection values of each of the pixels to generate a detection value for each of the pixels.

2. The imaging system as claimed in claim 1, wherein the detection unit is a microwave radiometer.

3. The imaging system as claimed in claim 1, wherein the rotatable reflection plate is disposed between the target area and the refractive focus unit, arranged such that radiation from the target area is reflected by the rotatable reflection plate to the refractive focus unit, and then focused by the refractive focus unit to the detection unit.

4. The imaging system as claimed in claim 1, wherein the rotatable reflection plate is disposed between the detection unit and the refractive focus unit, arranged such that radiation from the target area is focused by the refractive focus unit to the rotatable reflection plate, and then reflected by the rotatable reflection plate to the detection unit.

5. A scan method, suitable for an image system having a detection unit and a scan unit, the scan unit comprising a refractive focus unit and a rotatable reflection plate, the scan method comprising the steps of:

scanning a target area comprising a plurality of pixels with a scan unit by sequentially directing the radiation of each of the pixels of the target area to the detection unit N times at a constant speed within a scan period by the scan unit, such that each of the pixels of the target area is scanned N times by the scan unit, wherein the step of scanning comprises:

refracting and focusing the radiation by the refractive focus unit; and reflecting the radiation by the rotatable reflection plate, such that the radiation originating from the target area is directed to the detection unit; and generating N sub-detection values for each of the pixels according to the radiation respectively sensed by the detection unit in each of the N scans; and adding up the N sub-detection values of each of the pixels to generate a detection value for each of the pixels.

6. The scan method as claimed in claim 5, wherein the detection unit is a microwave radiometer.

7. The scan method as claimed in claim 5, wherein the rotatable reflector plate is disposed between the target area and the refractive focus unit such that radiation from the target area is reflected by the rotatable reflection plate to the refractive focus unit, and then focused by the refractive focus unit to the detection unit.

8. The scan method as claimed in claim 5, wherein the rotatable reflection plate is disposed between the detection unit and the refractive focus unit such that radiation from the target area is focused by the refractive focus unit to the rotatable reflection plate, and then reflected by the rotatable reflection plate to the detection unit.

* * * * *